(12) United States Patent
Shotey et al.

(10) Patent No.: US 8,314,333 B1
(45) Date of Patent: *Nov. 20, 2012

(54) GANGABLE ELECTRICAL UNIT

(75) Inventors: Marcus J. Shotey, Scottsdale, AZ (US);
Jeffrey P. Baldwin, Phoenix, AZ (US);
Richard L. Cleghorn, Tempe, AZ (US)

(73) Assignee: Hubbell Incorporated, Shelton, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/052,922

(22) Filed: Mar. 21, 2011

Related U.S. Application Data

(63) Continuation of application No. 12/366,174, filed on Feb. 5, 2009, now Pat. No. 7,910,828.

(60) Provisional application No. 61/114,397, filed on Nov. 13, 2008.

(51) Int. Cl.
*H01H 9/02* (2006.01)

(52) U.S. Cl. ............... 174/58; 174/66; 174/64; 174/60; 248/906; 33/528

(58) Field of Classification Search .............. 174/58, 174/59, 60, 64; 220/4.02; 439/535; 248/906; 33/528

See application file for complete search history.

(56) References Cited

U.S. PATENT DOCUMENTS

| 2,875,915 | A | 3/1959 | Buckels | |
|---|---|---|---|---|
| 5,005,792 | A | 4/1991 | Rinderer | |
| 5,839,594 | A | 11/1998 | Barbour | |
| 6,508,445 | B1 | 1/2003 | Rohmer | |
| 6,566,600 | B1 * | 5/2003 | Ford et al. | 174/50 |
| 6,710,245 | B2 | 3/2004 | Roesch et al. | |
| 6,774,307 | B2 | 8/2004 | Kruse et al. | |
| 6,872,884 | B2 | 3/2005 | Roesch et al. | |
| 6,955,559 | B2 | 10/2005 | Pyrros | |
| 7,098,399 | B1 | 8/2006 | Gretz et al. | |
| 7,667,137 | B1 * | 2/2010 | Beckman | 174/58 |
| 7,939,755 | B1 * | 5/2011 | Sapio | 174/58 |
| 8,035,029 | B2 * | 10/2011 | Mullen | 174/50 |
| 8,143,519 | B2 * | 3/2012 | Puccini | 174/59 |
| 2004/0159456 | A1 | 8/2004 | Archer et al. | |

* cited by examiner

*Primary Examiner* — Dhirubhai R Patel
(74) *Attorney, Agent, or Firm* — Booth Udall, PLC

(57) ABSTRACT

A gangable electrical unit for positioning an electrical component beside an electrical outlet box that includes a bracket having a wall structure that defines a front opening is disclosed. First and second arms extend from the bracket and may each include an attachment wall extending from a front edge of the bracket and a support wall extending from the bracket behind the attachment wall. The attachment wall may include an electrical box mounting aperture therethrough. The bracket is configured for attachment to an adjacent electrical device mounting box by aligning the electrical box mounting apertures of the first and second arms with electrical box mounting apertures of the adjacent electrical device box. In addition, a gap between the attachment walls of the first and second arms is larger than an outer wall height of the adjacent electrical device mounting box.

17 Claims, 5 Drawing Sheets

GANGABLE ELECTRICAL UNIT

CROSS REFERENCE TO RELATED APPLICATIONS

This document claims the benefit of the filing date of U.S. patent application Ser. No. 12/366,174 to Shotey et al. entitled "Gangable Electrical Unit", which is currently pending, and U.S. Provisional Patent Application 61/114,397 to Shotey, et al. entitled "Gangable Electrical Box," which was filed on Nov. 13, 2008, the disclosure of which is hereby incorporated herein by reference.

BACKGROUND

1. Technical Field

Aspects of the present documents relate to gangable electrical units which are mounted adjacent other electrical device mounting boxes for the installation of electrical components contained therein.

2. Background Art

Electrical outlets for powering electrical equipment are typically installed in boxes within walls or other structural elements. Electrical outlets typically have a voltage output of about 120 volts for a standard electrical outlet, although may have higher outputs depending upon the requirements of a particular application. Such outlets are commonly called high-voltage outlets. Electrical codes typically require high-voltage outlets to be enclosed by a box structure. Standard electrical boxes may contain any number of sections or "gangs," such as single-gang, double-gang, triple-gang, and so forth. Electrical boxes are typically configured for installation to a wall stud during initial construction of a structure, or during remodeling.

Low-voltage outlets have become increasingly used for low-voltage communications equipment such as telephone, cable, computer networks, and the like. Electrical codes typically do not require low-voltage outlets to be enclosed by a box structure. It is become routine practice to install electrical outlets in close proximity to cable and phone lines and access points, frequently in numerous locations within a single structure.

SUMMARY

Aspects of this document relate to gangable electrical boxes.

In one aspect, a gangable electrical unit for positioning an electrical component beside an electrical outlet box includes a bracket having a wall structure that defines a front opening. In addition, first and second arms extend from the bracket. The first and second arms each comprise an attachment wall extending from a front edge of the bracket, as well as a support wall that extends from the bracket behind the attachment wall. The attachment wall includes an electrical box mounting aperture therethrough. The bracket is configured for attachment to an adjacent electrical device mounting box by aligning the electrical box mounting apertures of the first and second arms with electrical box mounting apertures of the adjacent electrical device box. A gap between the attachment walls of the first and second arms is larger than an outer wall height of the adjacent electrical device mounting box.

Particular implementations may include one or more of the following. The box mounting aperture may comprise a reentrant opening. The reentrant opening may be oriented perpendicularly with respect to the attachment wall. The wall structure may comprise an enclosed box defining a front opening. The wall structure may be open on at least one side.

In another aspect, a gangable electrical unit for positioning an electrical component beside an electrical outlet box comprises a bracket having a wall structure that defines a front opening. In addition, first and second arms extend from the bracket. The first and second arms each comprise an attachment wall that extends from a front edge of the bracket. The attachment wall includes an electrical box mounting aperture therethrough. The bracket is configured for attachment to an adjacent electrical device mounting box by aligning the electrical box mounting apertures of the first and second arms with electrical box mounting apertures of the adjacent electrical device box. In addition, a gap between the attachment walls is larger than an outer wall height of the adjacent electrical device mounting box.

Particular implementations may include one or more of the following. The first and second arms may each comprise a support wall extending from the bracket behind the attachment wall. The support wall may extend from an outer surface of the bracket. The support wall may extend from an inner surface of the bracket. The box mounting aperture may comprise a reentrant opening. The reentrant opening may be oriented perpendicularly with respect to the attachment wall. The reentrant opening may be oriented parallel with respect to the attachment wall. The wall structure may comprise an enclosed box defining a front opening. The wall structure may be open on at least one side.

In still another aspect, a method of forming a ganged electrical unit comprises releasing from a first electrical device mounting box one or more mounting screws from one or more electrical box mounting apertures and thereafter aligning one or more electrical box mounting apertures of a gangable electrical unit with the one or more electrical box mounting apertures of the first electrical device mounting box. The method further includes replacing the one or more mounting screws of the first electrical device mounting box.

Particular implementations may include one or more of the following. Releasing one or more mounting screws may comprise removing one or more mounting screws. Releasing one or more mounting screws may comprise loosening one or more mounting screws. Replacing the one or more mounting screws of the first electrical device mounting box may comprise passing a mounting screw through both the electrical box mounting apertures of the gangable electrical unit with the one or more electrical box mounting apertures of the first electrical device mounting box. An electrical device may be mounted within the gangable electrical unit via one or more mounting bosses. An outer wall height of a first electrical device mounting box may be accommodated in a gap between two opposing gangable electrical unit attachment walls.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

A gangable electrical unit will hereinafter be described in conjunction with the appended drawings, where like designations denote like elements, and.

DESCRIPTION

This disclosure, its aspects and implementations, are not limited to the specific components or assembly procedures disclosed herein. Many additional components and assembly procedures known in the art consistent with the intended operation of an gangable electrical unit and/or assembly procedures for a gangable electrical unit will become apparent from this disclosure. Accordingly, for example, although particular gangable electrical units, brackets, wall structures, front openings, first and second arms, attachment walls, support walls, box mounting apertures, gaps, reentrant openings, enclosed boxes, are disclosed, such gangable electrical units, brackets, wall structures, front openings, first and second arms, attachment walls, support walls, box mounting apertures, gaps, reentrant openings, enclosed boxes, and implementing components may comprise any shape, size, style, type, model, version, measurement, concentration, material, quantity, and/or the like as is known in the art for such gangable electrical units, consistent with the intended operation of a gangable electrical unit.

Figure 1:
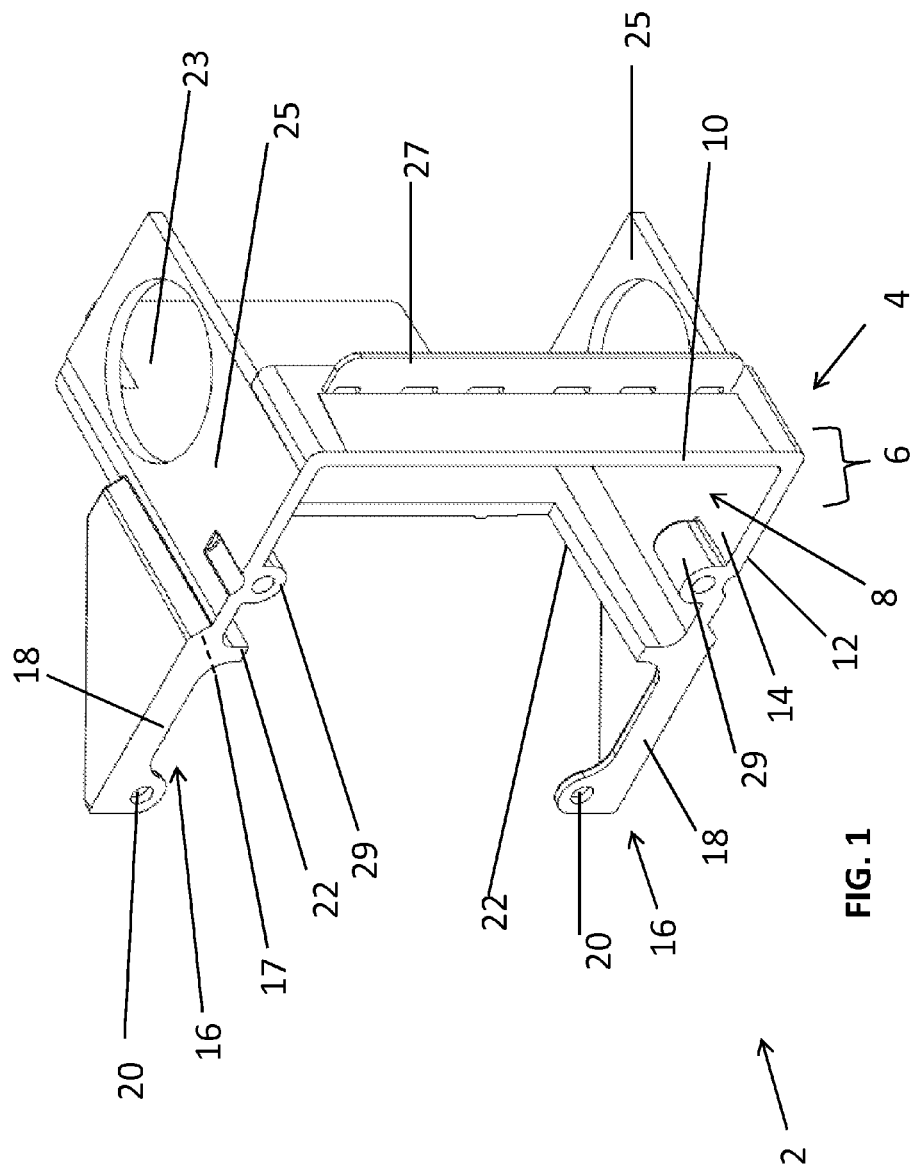
FIG. 1 is a perspective view of a first particular implementation of a gangable electrical unit.
Figure 2:
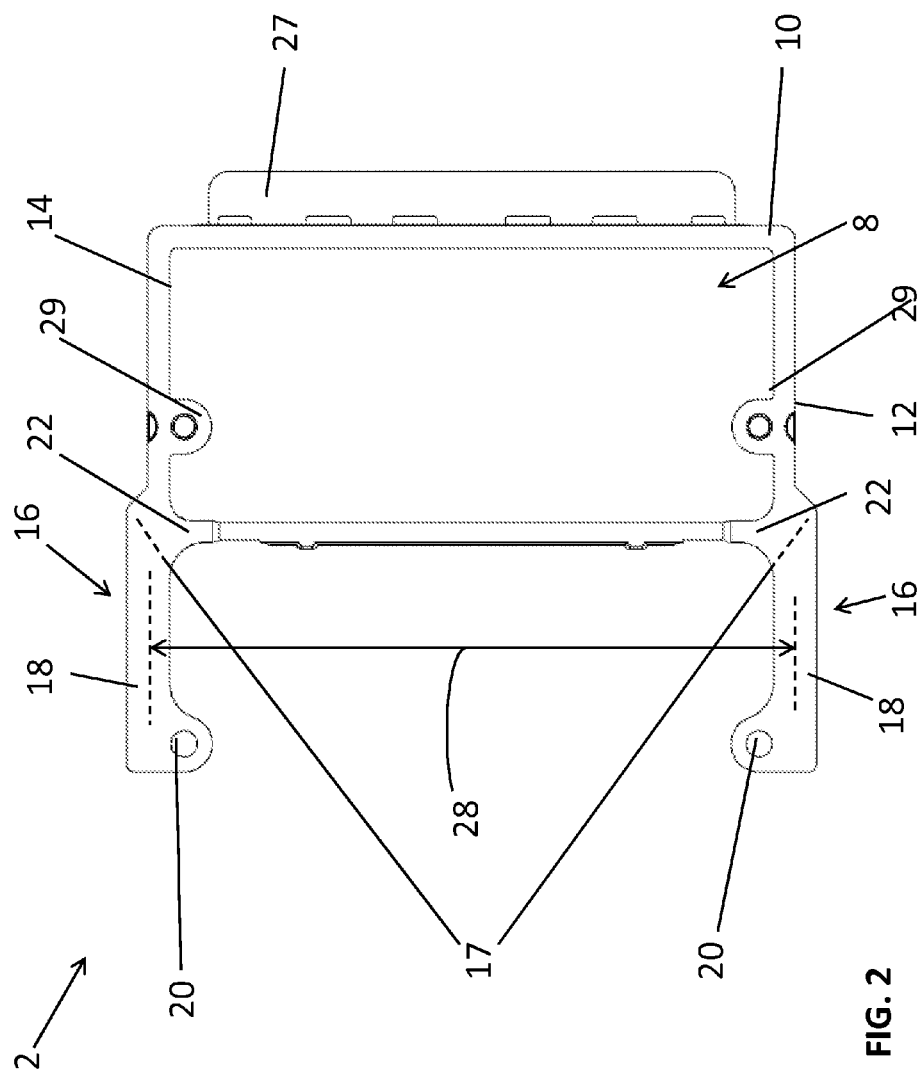
FIG. 2 is a front view of a first particular implementation of a gangable electrical unit.
Figure 3:
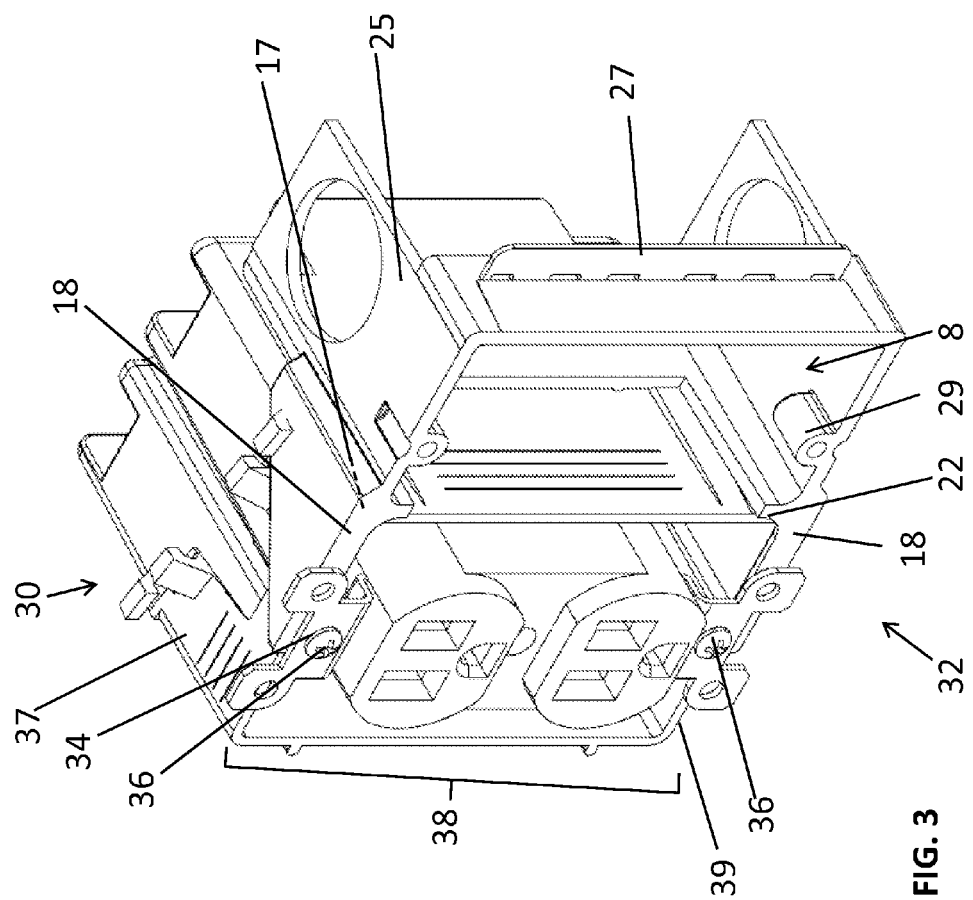
FIG. 3 is a perspective view of a first particular implementation of a gangable electrical unit removably coupled with an electrical device mounting box.

There are a variety of gangable electrical unit implementations disclosed herein. FIGS. 1-3 illustrate a first particular implementation of a gangable electrical unit. Gangable electrical unit 2 is shown alone in FIGS. 1 and 2 and in conjunction with an electrical device mounting box in FIG. 3. Gangable electrical unit 2 (and other particular implementations of gangable electrical units described herein) are used to "gang" a bracket 4 to an existing electrical device mounting box such as, by way of non-limiting example, first electrical device mounting box 30 (FIG. 3), in order to create additional electrical receptacles in the same general location as the existing electrical device mounting box. Gangable unit 2 may be ganged to any type of electrical unit, including a single-gang electrical box (as illustrated in FIG. 3), a double-gang electrical box, a dual-voltage electrical box, other multiple-gang electrical box configuration or other types of electrical units.

Accordingly, in those cases where existing building structures have only a single-gang outlet, or in those cases where no low-voltage electrical box (described further below) is provided adjacent to an existing high-voltage electrical box, a gangable electrical unit may be desirable to form a standard sized multi-ganged electrical units from the combination of an existing electrical box and one or more gangable electrical units.

A single gangable electrical unit 2 is shown joined to a single-gang electrical box in FIG. 3 to form a ganged electrical unit 32. Additional gangable electrical units according to this, and other implementations disclosed herein, may also be joined to ganged electrical unit 32 in order to form multiple-ganged electrical units 32. For example, in FIG. 3, an additional gangable electrical unit 2 (or other implementation of gangable electrical unit) may be added to free side 40 of first electrical device mounting box 30. Ganged electrical unit 32 (and other configurations of ganged electrical units possible with the various implementations of gangable electrical units disclosed herein) is sized and shaped such that when it is adjoined to another unit, a standard gang-unit is created. For instance, if a single-gang gangable electrical unit 2 is removably coupled with a single-gang electrical device mounting box 30, the resulting combination will form a standard double-gang unit, which may be covered by a standard double-gang wall plate (described further below). While first electrical device mounting box 30 has been depicted herein as single-gang, it may be other size gangs.

Referring specifically to FIG. 1, gangable electrical unit 2 comprises bracket 4. Bracket 4 includes a wall structure 6 defining a front opening 8. In particular, wall structure 6 comprises upper and lower opposing walls 25, which may comprise a hole or knockout tab 23 therethrough to allow the passage of a communication or power line (low-voltage or high-voltage, depending upon the particular box used and particular requirements of the application). Bracket 4 further comprises outer surface 12, inner surface 14, and front edge 10, which defines a front face of gangable electrical unit 2. Gangable electrical unit 2 further comprises first and second arms 16 which extend from bracket 4 parallel to one another. First and second arms 16 each comprise attachment wall 18 extending from front edge 10 of bracket 4, and a support wall 22 extending from the bracket behind attachment wall 18. Attachment wall 18 comprises electrical box mounting aperture 20 therethrough. Notwithstanding, in some particular implementations, one or both support walls 22 may be omitted. In other particular implementations, one or both support walls may be located on outer surface 12 or inner surface 14 of bracket 4.

As shown FIG. 3, first and second arms 16 extend from bracket 4 and are used to attach or removably couple gangable electrical unit 2 to another electrical unit such as, by way of non-limiting example, to first electrical device mounting box 30. An existing electrical unit may comprise a single-gang, multi-gang, low-voltage, high-voltage, dual-voltage, and/or other electrical unit. As illustrated, the gap 24 between attachment walls 18 is larger than an outer wall height of a standard adjacent electrical unit such as, by way of non-limiting example, outer wall height 38 of first electrical device mounting box 30. It will be understood that outer wall height 38 is equal to the distance between top outer surface 37 and bottom outer surface 39 of first electrical device mounting box 30. In addition to the foregoing, the electrical box mounting apertures 20 of first and second arms 16 of gangable electrical unit 2 are configured to align with electrical box mounting apertures of another electrical unit such as electrical box mounting apertures 34 of first electrical device mounting box 30. With mounting screws 36 removed from apertures 34, an installer may align electrical box mounting apertures 20 of first and second arms 16 with apertures 34, and then replace and tighten mounting screws 36 in apertures 34. No other attachment mechanisms are required to firmly engage a gangable electrical unit 2 with an adjoining unit, such as first electrical device mounting box 30. Therefore, an installer may use the mounting screws and mounting apertures of an existing electrical device mounting box to removably couple thereto a gangable electrical unit, forming a combination ganged electrical unit. While FIGS. 1-3 illustrate a first particular implementation where electrical box mounting apertures 20 comprise screw holes, in other particular implementations, such as those illustrated in FIGS. 4 and 5, configurations other than screw holes may be used.

Still referring to FIG. 3, electrical box mounting apertures 20 in first and second arms 16 (attachment walls 18) provide a self-centering function such that when electrical box mounting apertures 20 are aligned with the mounting apertures of an electrical unit (such as, by way of non-limiting example, mounting apertures 34 of first electrical device mounting box 30), and mounting screws 36 are tightened, gangable electrical unit 2 is inherently centered with respect to first electrical device mounting box 30 without the need to manually center gangable electrical unit 2. In addition, gangable electrical unit 2 may provide a self-squaring function such that when gangable electrical unit 2 is installed with respect to an electrical unit (such as first electrical device mounting box 30), the fit between electrical device mounting box 30 and corner 17, in conjunction with the tightening of mounting screws 36, serves to keep square gangable electrical unit 2 with respect to first electrical device mounting box 30 (or another gangable electrical unit).

Bracket 4 may further comprise one or more mounting bosses 29, which are configured to removably accept a fastener such as a screw. While the mounting bosses shown extend inwardly, other types of mounting bosses may also be used, including mounting bosses that extend outwardly. With a gangable electrical unit 2 installed with respect to a first electrical device mounting box 30, a user may install a cover plate over ganged electrical unit 32 via the mechanical cooperation of one or more fasteners (not shown) with one or more mounting bosses 29. Because implementations of gangable electrical units 2 comprise a standard gang-dimensions, when one or more gangable electrical units 2 are coupled with one or more electrical units (such as first electrical device mounting box 30), the resulting combination (such as ganged electrical unit 32), will comprise a standard gang dimension (such as single-gang, double gang, etc.), and may be covered by a standard cover plate.

Still referring to FIGS. 1-3, in some particular implementations, a "stop" or "mud flap" may be included. Specifically, stop 27 extends outwardly and substantially perpendicularly from outer wall 12 of bracket 4. Stop 27 is positioned a distance from front edge 10 that is equivalent to the standard thickness of drywall or wall board. A sheet of drywall may be positioned over stop 27 such that front edge 10 is flush with an outer surface of the drywall. Stop 27 may comprise perforations or thinned portions to make detachment easier in those applications where stop 27 is not needed and/or desired.

The implementation of gangable electrical unit 2 illustrated in FIGS. 1-3 is shown with box 26 open on at least one side, and therefore suitable for low-voltage applications, such as the installation of low-voltage cable, telephone, and computer lines. Notwithstanding, the term "low-voltage" is intended to encompass other types of low-voltage electrical lines and components. While box 26 shown in FIGS. 1-3 has at least one open side and is intended for low-voltage applications, it is specifically contemplated that an enclosed box 26 may be provided in particular implementations. In those implementations of gangable electrical unit 2 having an enclosed box 26, the gangable electrical unit 2 may be suitable for high-voltage applications such as standard residential or commercial power supply (since electrical codes may require high-voltage outlets to be enclosed by a box structure).

Figure 4:
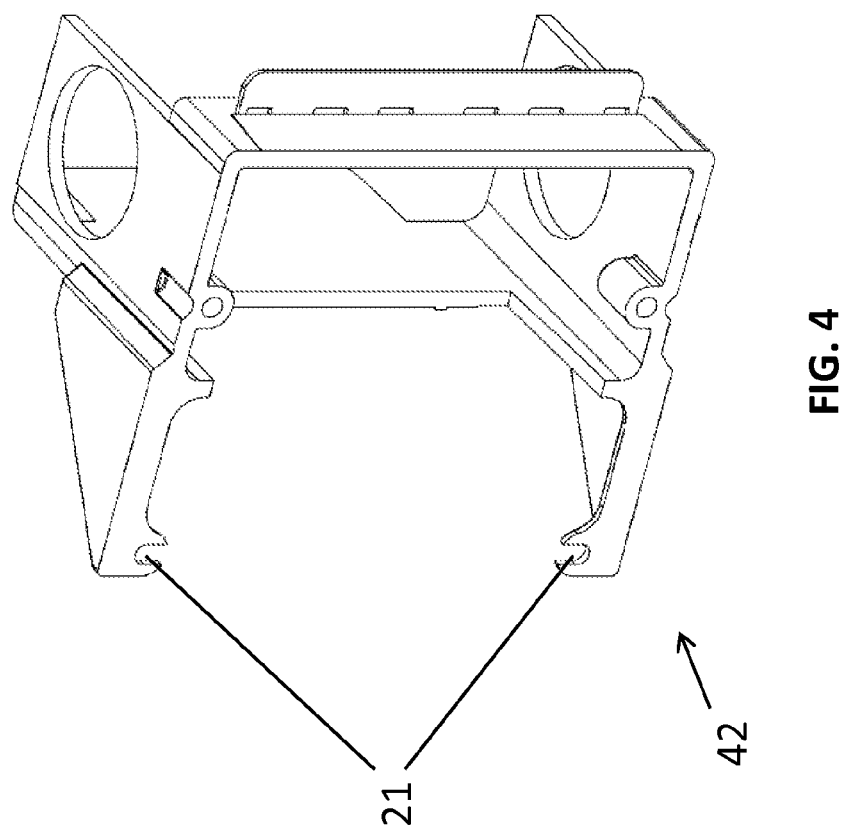
FIG. 4 is a perspective view of a second particular implementation of a gangable electrical unit.

Referring now to FIG. 4, this figure illustrates a second particular implementation of a gangable electrical unit 42. In this particular implementation, electrical box mounting apertures may comprise reentrant openings 21 that are oriented perpendicularly to the direction of extension of the first and second arms 16 from bracket 4.

Figure 5:
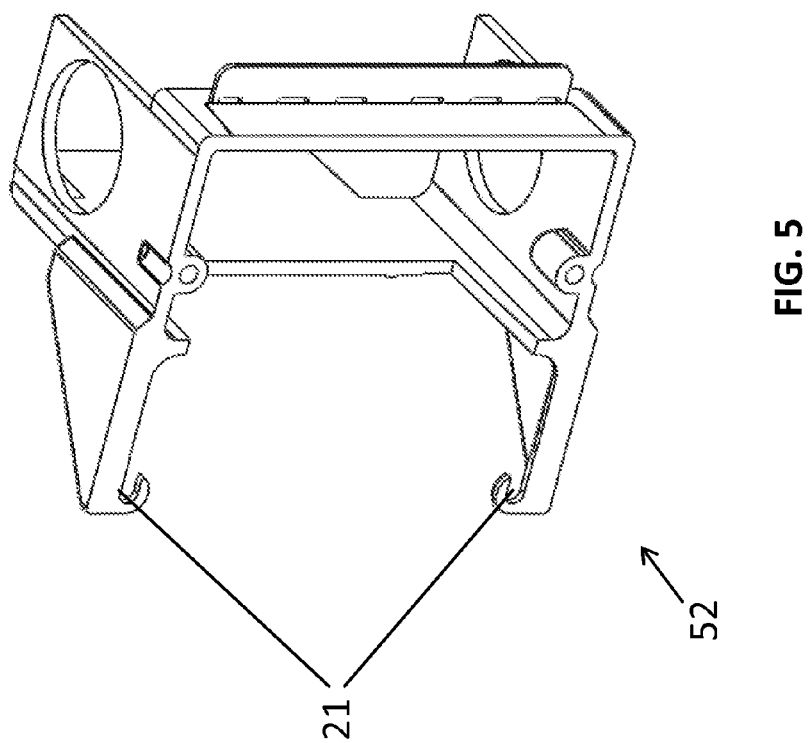
FIG. 5 is a perspective view of a third particular implementation of a gangable electrical unit.

With respect to FIG. 5, this figure illustrates a second particular implementation of a gangable electrical unit 52. In this particular implementation, electrical box mounting apertures 20 comprise reentrant openings 21 that are oriented parallel to the direction of extension of the first and second arms 16 from bracket 4. Although the particular implementation shows the reentrant openings 21 extending back toward the gangable electrical unit 52, they may also extend away from the main body of the gangable electrical unit 52.

It will be understood by those of ordinary skill in the art that the concepts of ganging gangable electrical units to another electrical unit to create ganged electrical units, as disclosed herein, is not limited to low-voltage electrical units or to the specific implementations shown herein. For example, it is specifically contemplated that the components included in a particular implementation of a gangable electrical unit may be formed of any of many different types of materials or combinations that can readily be formed into shaped objects and that are consistent with the intended operation of a gangable electrical unit. For example, the components may be formed of: rubbers (synthetic and/or natural) and/or other like materials; polymers and/or other like materials; plastics, and/or other like materials; composites and/or other like materials; metals and/or other like materials; alloys and/or other like materials; and/or any combination of the foregoing.

Furthermore, the gangable electrical units, brackets, wall structures, front openings, first and second arms, attachment walls, support walls, box mounting apertures, gaps, reentrant openings, enclosed boxes, and any other components forming a particular implementation of a gangable electrical unit may be manufactured separately and then assembled together, or any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled or removably coupled with one another in any manner, such as with adhesive, a weld, a fastener, any combination thereof, and/or the like for example, depending on, among other considerations, the particular material(s) forming the components.

It will be understood that particular implementations are not limited to the specific components disclosed herein, as virtually any components consistent with the intended operation of a method and/or system implementation for a gangable electrical unit may be utilized. Accordingly, for example, although particular gangable electrical units, brackets, wall structures, front openings, first and second arms, attachment walls, support walls, box mounting apertures, gaps, reentrant openings, and enclosed boxes may be disclosed, such components may comprise any shape, size, style, type, model, version, class, grade, measurement, concentration, material, weight, quantity, and/or the like consistent with the intended operation of a method and/or system implementation for a gangable electrical unit may be used.

In places where the description above refers to particular implementations of a gangable electrical unit, it should be readily apparent that a number of modifications may be made without departing from the spirit thereof and that these implementations may be applied to other gangable electrical units. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

The invention claimed is:

1. A gangable electrical unit for positioning an electrical component beside an electrical outlet box comprising:
   a bracket including a wall structure that defines a front opening comprising at least two mounting bosses, one on each of two opposing walls of the wall structure, the wall structure further comprising at least one support wall extending from at least one of the two opposing walls and at least partially between the opposing walls; and
   first and second arms each extending outward from a different one of the two opposing walls, the first and second arms each substantially parallel to the two opposing walls and comprising an attachment wall extending from a front edge of the bracket and comprising an electrical box mounting aperture therethrough;
   each of the electrical box mounting apertures being spaced from each other a distance corresponding to spacing of electrical box mounting screws of an adjacent electrical device mounting box; and,
   wherein the bracket is configured for attachment to the adjacent electrical device mounting box through an electrical device mounting screw.

2. The unit of claim 1, wherein the box mounting aperture comprises a reentrant opening.

3. The unit of claim 2, wherein the reentrant opening is oriented perpendicular with respect to the attachment wall.

4. The unit of claim 2, wherein the reentrant opening is oriented parallel with respect to the attachment wall.

5. The unit of claim 2, wherein the reentrant opening is in communication with an opening defined by the first and second arms.

6. The unit of claim 1, wherein the wall structure comprises an enclosed box defining a front opening.

7. The unit of claim 1, wherein the wall structure is open on at least one side.

8. The unit of claim 1, wherein the support wall extends from an outer surface of the bracket.

9. The unit of claim 1, wherein the support wall extends from an inner surface of the bracket.

10. The unit of claim 1, wherein the wall structure is open on at least one side.

11. The unit of claim 1, wherein the wall structure further comprises a knockout tab for routing a wire there through.

12. The unit of claim 1, wherein the wall structure further comprises a stop.

13. The unit of claim 1, wherein a gap between the attachment walls of the first and second arms is larger than an outer wall height of the adjacent device mounting box.

14. A method of forming a ganged electrical unit comprising:
   releasing from a first electrical device mounting box one or more mounting screws from one or more electrical box mounting apertures;
   abutting a stop of a gangable electrical unit against a mounting wall;
   aligning one or more electrical box mounting apertures of the gangable electrical unit with the one or more electrical box mounting apertures of the first electrical device mounting box, the gangable electrical unit comprising at least two mounting bosses, one on each of the opposing walls of the gangable electrical unit, and an arm extending outward at least one of the two opposing walls of the gangable electrical unit toward the first electrical device mounting box, each of the one or more electrical mounting apertures of the gangable electrical unit is placed immediately adjacent to the first electrical device mounting box, each of the one or more electrical box mounting apertures of the gangable electrical unit aligns with one of the one or more electrical mounting apertures of the gangable electrical unit; and
   replacing the one or more mounting screws of the first electrical device mounting box.

15. The method of claim 14, wherein the one or more arms extends outward beyond the at least two mounting boxes.

16. The method of claim 14, wherein releasing one or more mounting screws comprises loosening one or more mounting screws.

17. The method of claim 14, further comprising mounting an electrical device within the gangable electrical unit via one or more mounting bosses.

* * * * *